July 4, 1961   D. E. GRISWOLD   2,991,404
SWITCH CONTROL SYSTEM FOR ELECTRIC MOTOR
Filed July 5, 1957   2 Sheets-Sheet 1
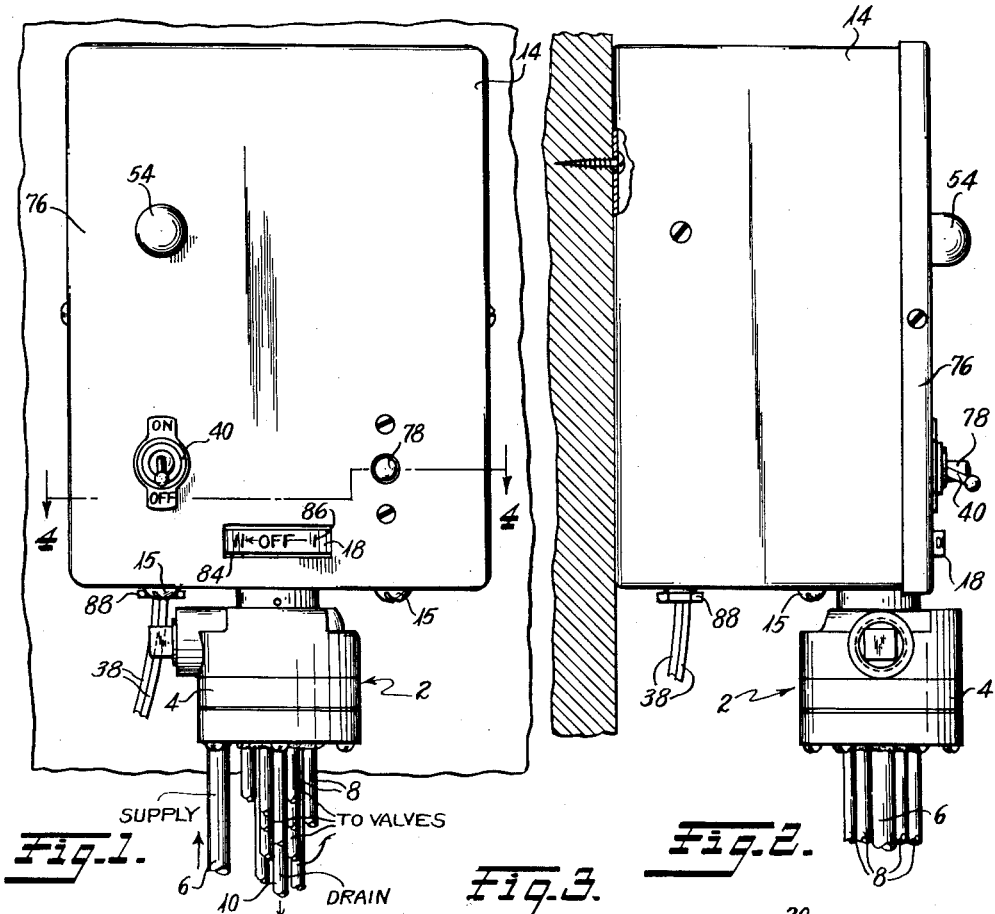
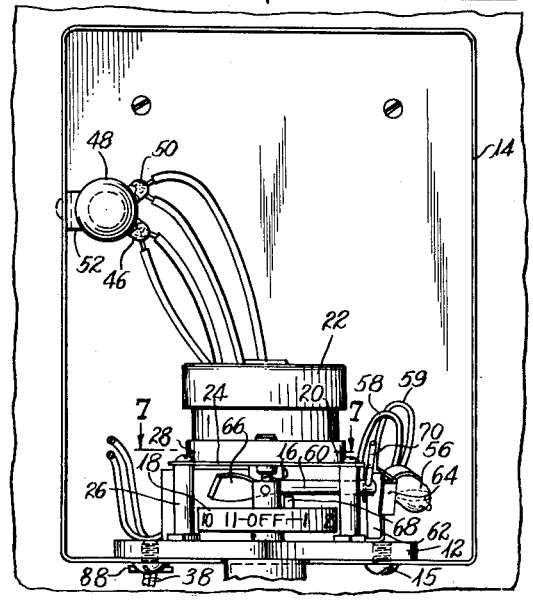
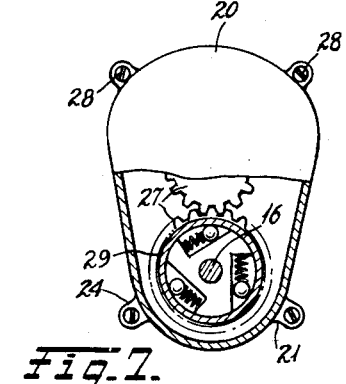
INVENTOR.
David E. Griswold
BY
Bacon & Thomas
ATTORNEYS July 4, 1961  D. E. GRISWOLD  2,991,404
SWITCH CONTROL SYSTEM FOR ELECTRIC MOTOR
Filed July 5, 1957  2 Sheets-Sheet 2

INVENTOR.
David E. Griswold
BY
Bacon & Thomas
ATTORNEYS

United States Patent Office 2,991,404
Patented July 4, 1961

2,991,404
SWITCH CONTROL SYSTEM FOR ELECTRIC MOTOR

David E. Griswold, Newport Beach, Calif., assignor to Donald G. Griswold, Newport Beach, Calif.
Filed July 5, 1957, Ser. No. 670,061
6 Claims. (Cl. 318—466)

This invention relates to control systems, and particularly to a control system for a cyclically operable mechanism. As described herein, the control system is employed to control the starting and stopping of a rotary pilot valve arranged to effect sequential operation of control valves in a fluid distribution system.

In general, the invention comprises an electric motor for driving a rotary pilot valve through a cycle of operation and includes a rotary cam in the drive from the motor to the pilot valve, which cam controls the motor circuit. The cam is arranged to open the motor circuit and stop the motor at the completion of each cycle of operation, represented by a single rotation of the cam and pilot valve. A further manually operable switch is provided to start the motor when desired to initiate a cycle of operation, which switch remains in closed position until just shortly before completion of the cycle. At that time the cam is effective to open the manually operable switch but conditions the same for manual reclosing, if desired, prior to completion of that cycle. The cam and driven mechanism are drivingly connected and independently rotatable in cycle-advancing direction independently of the motor so that the cam may be manually rotated in an advance direction to start the operation of the mechanism at an intermediate point in its cycle. Normally the cam then stops the motor at the completion of the cycle. Thereafter the manual switch may be closed to restart the motor and the manual switch remains closed until again opened by the cam prior to completion of the cycle. If desired, the manual switch can be closed after it has been opened by the cam but before the cam opens the motor circuit, to thereby cause the motor to drive the mechanism through a succeeding cycle of operation without stopping at the end of the first cycle.

It is therefore an object of this invention to provide a control system for controlling a motor driving a cyclically operable mechanism wherein the motor is stopped at the end of a cycle and may be manually restarted at will.

Another object of this invention is to provide a control system for a cyclically operable mechanism whereby the mechanism may be manually advanced to any point in its cycle and will continue to complete its cycle without further attention.

Still another object of this invention is to provide a control system for automatically stopping a driving motor at the completion of one cycle of operation of a driven mechanism and a selectively operable means to condition the system to cause the motor to drive the mechanism through a succeeding cycle without stopping at the end of the first cycle.

A further object is to provide a control system as set forth above that is simple in construction, economical to manufacture, and reliable in operation.

Additional and further objects and advantages will become apparent to those skilled in the art as the description proceeds in connection with the accompanying drawings, wherein:

FIG. 1 is a front view of an apparatus embodying the present invention;

FIG. 2 is a side elevation of the structure shown in FIG. 1;

FIG. 3 is a front view of a portion of the apparatus shown in FIG. 1 with the cover plate removed;

FIG. 7 is a fragmentary sectional view taken on the line 7—7 of FIG. 3, showing a part of the reduction gearing, and the one-way clutch.

Figure 4:
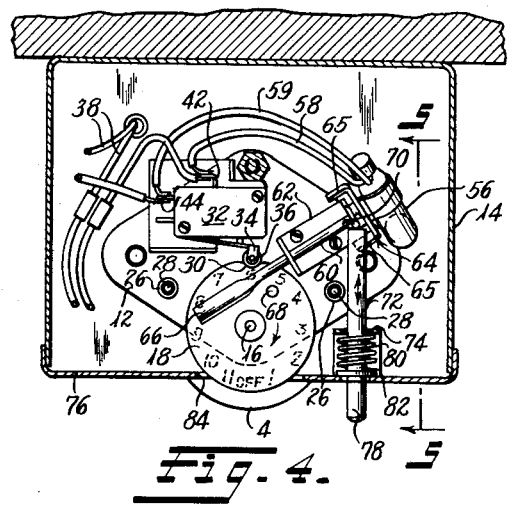
FIG. 4 is a horizontal sectional view taken substantially along the line 4—4 of FIG. 1.

The control system of the present invention is described herein for use in controlling a pilot valve mechanism 2 comprising a rotary disc valve in casing 4. A water pressure supply conduit 6 supplies water under pressure to the interior of the casing 4. The rotary valve in casing 4, when rotated, is effective to sequentially connect the pressure liquid to selected conduits 8 extending to valves to be controlled thereby and to connect certain of said conduits to a drain conduit 10. The details of the valve mechanism 2 form no part of the present invention and may be of the form described and claimed in the copending application of David E. Griswold, filed May 4, 1956, entitled "Process Controller," and assigned Serial No. 582,887.

The valve mechanism 2 is supported by a supporting plate 12 (see Fig. 3) mounted on the bottom wall of a protective housing 14 by means of screws 15. A shaft 16, connected to the rotary disc valve in mechanism 2, extends upwardly through the supporting plate 12 and has mounted thereon a disc cam 18. The shaft 16 extends upwardly above the cam 18 into a gear reduction box 20 constituting part of a drive motor 22. The motor 22 and its gear box 20 are provided with a mounting plate 24 supported on the supporting plate 12 and spaced therefrom by means of suitable spacers 26 and bolts 28. The gear box 20 includes a speed-reducing gear drive 27 from motor 22 to shaft 16 and includes a one-way clutch mechanism 29 (FIG. 7) whereby the cam 18 and shaft 16 may be rotated in an advance direction independently of operation of the motor 22.

The cam 18 is provided with a circular periphery having a single notch or depression 30 therein. A motor control switch 32 is mounted on the supporting plate 12 adjacent the cam 18 and is provided with an operating member 34 having a cam follower roller 36 thereon engaging the periphery of cam 18. The switch 32 is preferably a conventional snap switch having contacts that are separated to "open switch" condition when the roller 36 moves outwardly and actuated to closed condition when the roller 36 is moved inwardly of the switch body.

Figure 6:
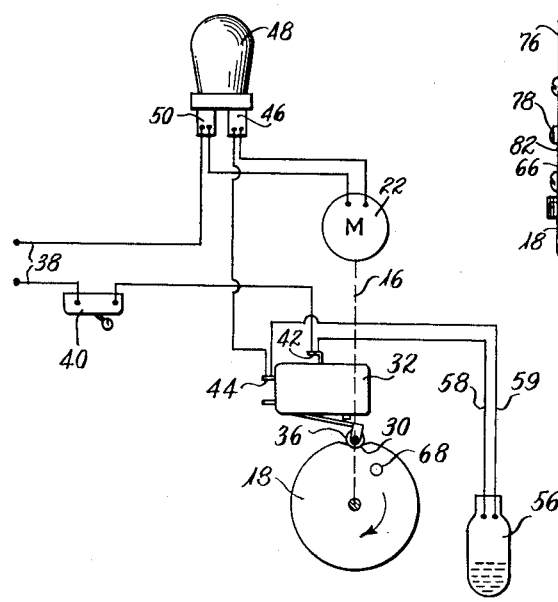
FIG. 6 is a schematic wiring diagram for the apparatus shown in FIGS. 1 through 5.

Referring now to FIG. 6, a source of electrical current is represented by conductors 38. One of the conductors includes an off-on switch 40 and is connected to terminal 42 of the switch 32. The terminal 42 is connected to one of the contacts referred to, the other contact for that pair being actuated by roller 36 and connected to a terminal 44 of the switch 32 which, in turn, is connected, through a lug 46 on the base of signal lamp 48, to one side of the motor 22. The other conductor 38 is connected through a second lug 50 of the signal light 48 to the other side of the motor 22. It will thus be seen that as long as the roller 36 engages the circular portion of the periphery of cam 18, switch 32 will be closed and a circuit completed through motor 22 to drive the mechanism. When the cam 18 has reached the position shown in FIG. 6, roller 36 drops into the notch or depression 30, thus opening switch 32 and interrupting the circuit through the motor 22 whereupon the motor stops. The position of cam 18 shown in FIG. 6 may be referred to as its end-of-cycle position.

As also shown in FIG. 6, the signal light 48 is in the motor circuit, in parallel with the motor 22. Thus any time the motor is running, the signal light 48 is energized to indicate the fact that the mechanism 2 is being driven through a cycle. The signal light 48 may be mounted in any suitable manner in the housing 14 and is shown, in FIG. 3, as being mounted on a bracket 52 to position the signal light 48 behind a "lens" 54 carried by the front wall of the housing 14.

Referring again to FIG. 6, a manually operable mercury switch 56, of conventional construction, is connected in parallel with switch 32 by having its terminal leads 58 and 59 connected respectively to the terminals 42 and 44 of switch 32. Since the switch 56 is in parallel with switch 32, obviously the switch 56 may be closed (in a manner to be described) while roller 36 is in notch 30 and thus complete a circuit through motor 22 to start operation of the same. When motor 22 is thus started by closing switch 56, it continues to run and rotates cam 18 whereupon roller 36 rides out of notch 30 onto the circular periphery of cam 18 to close switch 32. Thereafter switch 56 may be opened but motor 22 will continue to run since its circuit is then closed through switch 32 and the motor continues to operate until completion of a cycle.

The mercury switch 56 is fixedly mounted at one end of a rock shaft (see FIG. 4) journalled in a bracket 62 carried by mounting plate 12. A U-shaped member 64 is also fixed to the shaft 60 adjacent switch 56 and is arranged with its arms 65 extending past one end of the bracket 62, as shown. The member 64 thus acts as a stop device to limit rotation of the shaft 60 in either direction by engagement of arms 65 with bracket 62. The shaft 60 is arranged to extend over and slightly spaced from the upper face of cam 18 and the end of shaft 60 overlying a portion of cam 18, is flattened, as at 66 (see also FIG. 3) whereby the edges of the flattened portion constitute radial projections on the shaft 60. The flattened portion 66 is so angularly related to the axis of the mercury switch 56 that the switch 56 is "closed" when the flattened portion 66 lies in a generally upright or vertical plane. When the flattened portion 66 extends generally vertically its lowermost edge is in relatively close proximity to the upper surface of the cam 18.

The cam 18 is provided with an upstanding pin or projection 68 thereon inwardly of the periphery of the cam and in position to engage the lower edge portion of the flattened portion 66 of shaft 60 when the cam 18 rotates. The flattened portion 66 is of such extent that it is engaged by the pin 68 when the pin 68 is moving upwardly on the left side of shaft 16 as seen in FIG. 4 and so arranged that the pin 68 passes under shaft 60 without engaging the portion 66 thereof, when the pin is moving downwardly to the right of shaft 16 as seen in FIG. 4. The rock shaft 60 can rock to such an extent that the pin 68 can pass freely under the flattened portion 66. As is also evident from FIGS. 4 and 6, the pin 68 is mounted on the cam 18 in advance of the notch 30.

Referring now to FIG. 4, assume that the shaft 60 is rocked to such position that the switch 56 is closed and the flattened portion 66 extends generally vertically. Rotation of the cam 18 is started in a clockwise direction (the "forward" direction) and the mechanism and cam 18 will continue to rotate and pin 68 will eventually engage the lower portion of the flattened portion 66 of shaft 60 well below the axis of the shaft. Continued rotation of the cam causes shaft 60 to rock in a clockwise direction as viewed from the left of FIG. 4 to tilt the switch 56 to "open" position. The shaft 60 can rock sufficiently far to permit pin 68 to pass under the flattened portion 66. The switch 56 is thus opened prior to the time notch 30 reaches the position of roller 36. There is thus an interval of time between the opening of switch 56 and the opening of switch 32 at the completion of a cycle. During that interval switch 56 may be manually rocked to closed position, in a manner to be described, whereupon the control device will cause the motor 22 to drive the mechanism 2 through a second cycle of operation without stopping at the end of the first cycle. Clearly if switch 56 is closed at the time roller 36 drops into notch 30, the circuit through motor 22 is maintained closed and the motor continues to operate.

Figure 5:
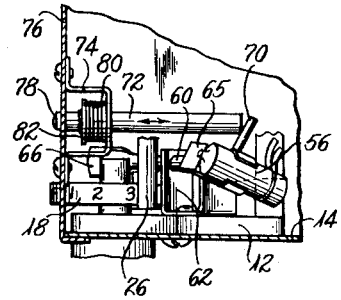
FIG. 5 is a fragmentary vertical sectional view taken substantially along the line 5—5 of FIG. 4.

A generally upstanding pin 70 is fixed to the shaft 60 in position to extend up into the path of movement of the end of a manually operable plunger 72. The plunger 72 is mounted for axial sliding movement in a bracket 74 mounted on the removable front cover 76 of the casing 14 and is provided with a "button" portion 78 extending through an opening in the cover 76. A compression spring 80 engages the inner face of the bracket 74 and a collar or washer 82 fixed to plunger 72 whereby to normally urge the plunger outwardly (to the left as seen in FIG. 5). It will thus be obvious that by manually pushing the button 78 inwardly the plunger 72 will engage upstanding pin 70 and rock the shaft 60 in a direction to close mercury switch 56. Upon release of the button 78 the plunger 72 again moves outwardly under the influence of spring 80 but the switch 56 remains in its closed position. With the plunger 72 in its outward position, it is clear that the pin 68 can, at any time, rock the shaft 60 to open the switch 56, without interference from plunger 72.

The removable cover 76 for the housing 14 is provided with a rectangular opening 84 through which a portion of the periphery of cam 18 extends when the cover is in place on the housing 14. As previously stated, the cam 18 may be rotated manually in a cycle-advancing direction. With the periphery of the cam 18 thus exposed through the cover of the housing, the cam is readily accessible for manual actuation. As also clearly shown in the drawings, the peripheral face of the cam 18 is provided with suitable indicia 86 to indicate the portion of the cycle of mechanism 2 in which the parts are positioned. The indicia 86 may be of such character as to indicate which of the valves controlled by conduits 8 and 10 is then actuated or opened. The indicia 86 thus facilitate the manual positioning of the cam 18 to start a cycle of operation at any desired intermediate part of the cycle.

The off-on switch 40, plunger 72 and lens 54 are the only portions of the device mounted on the cover plate 76. Therefore, the cover plate may be removed without disconnecting any portions of the assembly in the housing 14. The leads from off-on switch 40 to the remainder of the circuit are preferably left relatively long so that the cover may be moved aside to render the internal mechanism accessible. The electrical conductors 38, described in connection with FIG. 6, extend outwardly of the housing 14 through a suitable grommet 88 (FIG. 1) in the bottom wall of the housing and constitute a lead-in cable, as shown.

While a single specific embodiment of the invention has been shown and described herein, the same is merely illustrative of the principles of the invention. The invention contemplates other embodiments falling within the scope of the appended claims.

I claim:
1. In a control system, a motor for driving a mechanism through a cycle of operation, a cam driven by said motor to make not more than one revolution per cycle, a first motor control switch, in a motor operating circuit, operated by said cam and arranged to be opened thereby to discontinue current flow in said circuit at the end of each cycle, a manually closable switch, in a circuit connected with said motor, in parallel with said first switch and operable to start said motor while said cam holds said first switch open, and means connected with said manually closable switch in the path of said cam for actuation thereby to open said manually closable switch prior to completion of a cycle.

2. In a control system, a rotary mechanism adapted to be driven through a cycle of operation, a motor, drive means connecting said motor to said mechanism, said drive means including a rotary cam, a motor control switch having operating means in the form of a cam follower engaging said cam, said cam having a configuration to open said motor control switch at only one position of said cam, corresponding to the end of a cycle of said mechanism, and to close said motor control switch at all other positions of said cam, a second switch in parallel with said motor control switch and arranged to remain in either open or closed position, manually operable means for closing said second switch to initiate a cycle of operation of said rotary mechanism, and operating means connected with said second switch and operable by said cam for opening said second switch prior to completion of said cycle, whereby the opening of said motor control switch, at the end of a cycle of said mechanism, is effective to stop said motor.

3. A control system as defined in claim 2 including one-way clutch means in said drive means, wherein said cam and mechanism are rotatable in cycle-advancing direction independently of said motor, whereby said mechanism and cam may be advanced from end-of-cycle position to any selected portion of their cycle whereupon said motor starts to drive said cam and mechanism through the remainder of said cycle, said cam having a peripheral portion manually engageable to advance the same and bearing indicia indicating the portion of said cycle to which it is advanced, a housing surrounding said control system, and an opening in said housing through which a peripheral portion of the cam projects to facilitate manual actuation.

4. In a control system, a rotary mechanism adapted to be driven through a cycle of operation, a motor, drive means connecting said motor to said mechanism, said drive means including a rotary cam, a motor control switch having operating means in the form of a cam follower engaging said cam, said cam having a configuration to open said motor control switch at only one position of said cam, corresponding to the end of a cycle of said mechanism, and to close said motor control switch at all other positions of said cam, a second switch in parallel with said motor control switch and arranged to remain in either open or closed position, manually operable means for closing said second switch to initiate a cycle of operation of said rotary mechanism, operating means connected to said cam and said second switch for opening said second switch prior to completion of said cycle, the opening of said motor control switch, at the end of a cycle of said mechanism, being effective to stop said motor, one-way clutch means in said drive means whereby said cam and mechanism are rotatable in cycle advancing direction independently of said motor, and said mechanism and cam may be advanced from end-of-cycle position to any selected portion of their cycle, whereupon said motor starts to drive said cam and mechanism through the remainder of said cycle, said cam having a peripheral portion manually engageable to advance the same and bearing indicia indicating the portion of said cycle to which it is advanced, and a housing enclosing said motor, switches and cam, an opening in the front face of said housing, and a portion of the periphery of said cam extending outwardly of said housing through said opening.

5. In a control system, a rotary mechanism adapted to be driven through a cycle of operation, a motor, drive means connecting said motor to said mechanism, said drive means including a rotary cam, a motor control switch in the form of a cam follower engaging said cam, said cam having a configuration to open said motor control switch at only one position of said cam, corresponding to the end of a cycle of said mechanism, and to close said motor control switch at all other positions of said cam, a second switch in parallel with said motor control switch and arranged to remain in either open or closed position, said second switch being a tiltable mercury switch mounted on a rock shaft, a portion of said shaft extending to a position adjacent a face of said cam and having a radial projection thereon, a projection on said face of said cam engageable with said radial projection to rock said shaft in a direction to open said second switch, a further projection on said shaft, and a manually operable member engageable with said further projection to rock said shaft in a direction to close said switch.

6. A control system as defined in claim 5 wherein said projection on said cam has a configuration and is so positioned thereon that said second switch is opened and said projection on said cam clears said radial projection on said shaft before said cam reaches the end of its cycle, whereby said second switch may be again closed manually before the end of a cycle and thereby cause said motor to drive said mechanism through a second cycle without stopping.

References Cited in the file of this patent

UNITED STATES PATENTS

| | | |
|---|---|---|
| 1,809,327 | Badgley | June 9, 1931 |
| 1,898,139 | Nordin | Feb. 21, 1933 |
| 2,708,259 | Feldhausen et al. | May 10, 1955 |
| 2,833,976 | Kennedy et al. | May 6, 1958 |

FOREIGN PATENTS

| | | |
|---|---|---|
| 963,857 | France | Jan. 18, 1950 |